(12) United States Patent
Yokoyama et al.

(10) Patent No.: US 10,846,212 B2
(45) Date of Patent: Nov. 24, 2020

(54) EVIDENCE GATHERING SYSTEM AND METHOD

(71) Applicant: HITACHI, LTD., Tokyo (JP)

(72) Inventors: Takahiro Yokoyama, Tokyo (JP); Shinji Hamada, Tokyo (JP); Noriaki Takahashi, Tokyo (JP); Hirokazu Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 121 days.

(21) Appl. No.: 16/082,547

(22) PCT Filed: Aug. 4, 2016

(86) PCT No.: PCT/JP2016/073005
§ 371 (c)(1),
(2) Date: Sep. 6, 2018

(87) PCT Pub. No.: WO2018/025383
PCT Pub. Date: Feb. 8, 2018

(65) Prior Publication Data
US 2019/0034325 A1    Jan. 31, 2019

(51) Int. Cl.
*G06F 11/36*     (2006.01)
*G06Q 30/06*     (2012.01)

(52) U.S. Cl.
CPC ...... *G06F 11/3692* (2013.01); *G06F 11/3688* (2013.01); *G06Q 30/0635* (2013.01); *G06F 11/3664* (2013.01); *G06F 11/3672* (2013.01)

(58) Field of Classification Search
CPC ............. G06F 11/3688; G06F 11/3664; G06F 11/3692; G06F 11/3696; G06F 11/2268;
(Continued)

(56) References Cited

U.S. PATENT DOCUMENTS

2006/0265354 A1* 11/2006 Phibbs, Jr. .......... G06F 16/2457
2007/0083630 A1*  4/2007 Roth .................... H04L 41/5038
                                                                 709/223
(Continued)

FOREIGN PATENT DOCUMENTS

JP    2005-092590 A    4/2005
JP    2010-003224 A    1/2010
(Continued)

OTHER PUBLICATIONS

International Search Report of PCT/JP2016/073005 dated Sep. 6, 2016.
(Continued)

*Primary Examiner* — Matthew M Kim
*Assistant Examiner* — Matthew N Putaraksa
(74) *Attorney, Agent, or Firm* — Mattingly & Malur, PC

(57) ABSTRACT

Proposed is an evidence gathering system and method capable of reducing the burden on an operative performing system tests. A first agent which is installed in a client gathers evidence of a test result in the client at the time of a system test, and a second agent which is installed in a second server apparatus gathers evidence, of a test result in the second server apparatus at the time of the system test, which includes at least pre/post-update data of the database which has been updated as a result of the system test, gathers the evidence in the client of the system test from the first agent, gathers the evidence in the second server apparatus of the system test from the second agent, and integrates the gathered evidence for each of the system tests.

6 Claims, 15 Drawing Sheets

(58) Field of Classification Search
CPC ... G06F 2221/033; G06F 8/65; G06F 16/2379
See application file for complete search history.

(56) References Cited

U.S. PATENT DOCUMENTS

| | | | |
|---|---|---|---|
| 2009/0089761 A1* | 4/2009 | Lazzaro | G06F 11/3636 |
| | | | 717/128 |
| 2009/0231206 A1 | 9/2009 | Shamblin et al. | |
| 2010/0023151 A1 | 1/2010 | Shieh et al. | |
| 2012/0285611 A1 | 11/2012 | Desclos et al. | |
| 2015/0081598 A1* | 3/2015 | Depizzol | G06F 11/3664 |
| | | | 706/12 |

FOREIGN PATENT DOCUMENTS

| JP | 2011-518425 A | 6/2011 |
|---|---|---|
| JP | 2015-169950 A | 9/2015 |

OTHER PUBLICATIONS

Japanese Office Action received in corresponding Japanese Application No. 2018-531695 dated Jul. 9, 2019.

\* cited by examiner

FIG.6

CLIENT SCREEN DATA MANAGEMENT TABLE

| TEST ID | ACQUISITION TIME | PRE/POST-ORDER PLACEMENT | SCREEN DATA |
|---------|------------------|--------------------------|-------------|
| 1 | 9:03 | PRE-UPDATE | |
| 1 | 9:04 | POST-UPDATE | |
| 2 | 9:06 | PRE-UPDATE | |
| 2 | 9:07 | POST-UPDATE | |
| ... | ... | ... | ... |

HTTP TELEGRAM MANAGEMENT TABLE

| TEST ID | SEND/RECEIVE TIME | TELEGRAM TYPE | TELEGRAM CONTENT |
|---------|-------------------|---------------|------------------|
| 1 | 9:03 | REQUEST | 0x12... |
| 1 | 9:04 | RESPONSE | 0x22... |
| 2 | 9:06 | REQUEST | 0x14... |
| 2 | 9:07 | RESPONSE | 0x24... |
| ... | ... | ... | ... |

WEB SERVER LOG INFORMATION MANAGEMENT TABLE

| TEST ID | LOG UPDATE TIME | FILE NAME | LOG DATA |
|---|---|---|---|
| 1 | 8:50 | log1 | 8:30 xxx<br>8:50 yyy |
| 2 | 9:06 | log2 | 8:51 aaa<br>9:06 bbb |
| ... | ... | ... | ... |

PRE/POST UPDATE DB TABLE MANAGEMENT TABLE

| TEST ID | ACQUI-SITION TIME | TELE-GRAM TYPE | TELE-GRAM CONTENT | PRE/POST-UPDATE | TARGET DB TABLE | TARGET ROW UPDATE PRE/POST-UPDATE CONTENT |
|---|---|---|---|---|---|---|
| 1 | 9:00 | REQUEST | Incert... | PRE-UPDATE | TABLE A | NONE |
| 1 | 9:01 | RESPONSE | xx... | POST-UPDATE | TABLE A | no data / 2 A |
| 2 | 9:03 | REQUEST | Update... | PRE-UPDATE | TABLE A | no data / 2 A |
| 2 | 9:04 | RESPONSE | xx... | POST-UPDATE | TABLE A | no data / 2 B |
| ... | ... | ... | ... | ... | ... | ... |

86A  86B  86C  86D  86E  86F  86G  86

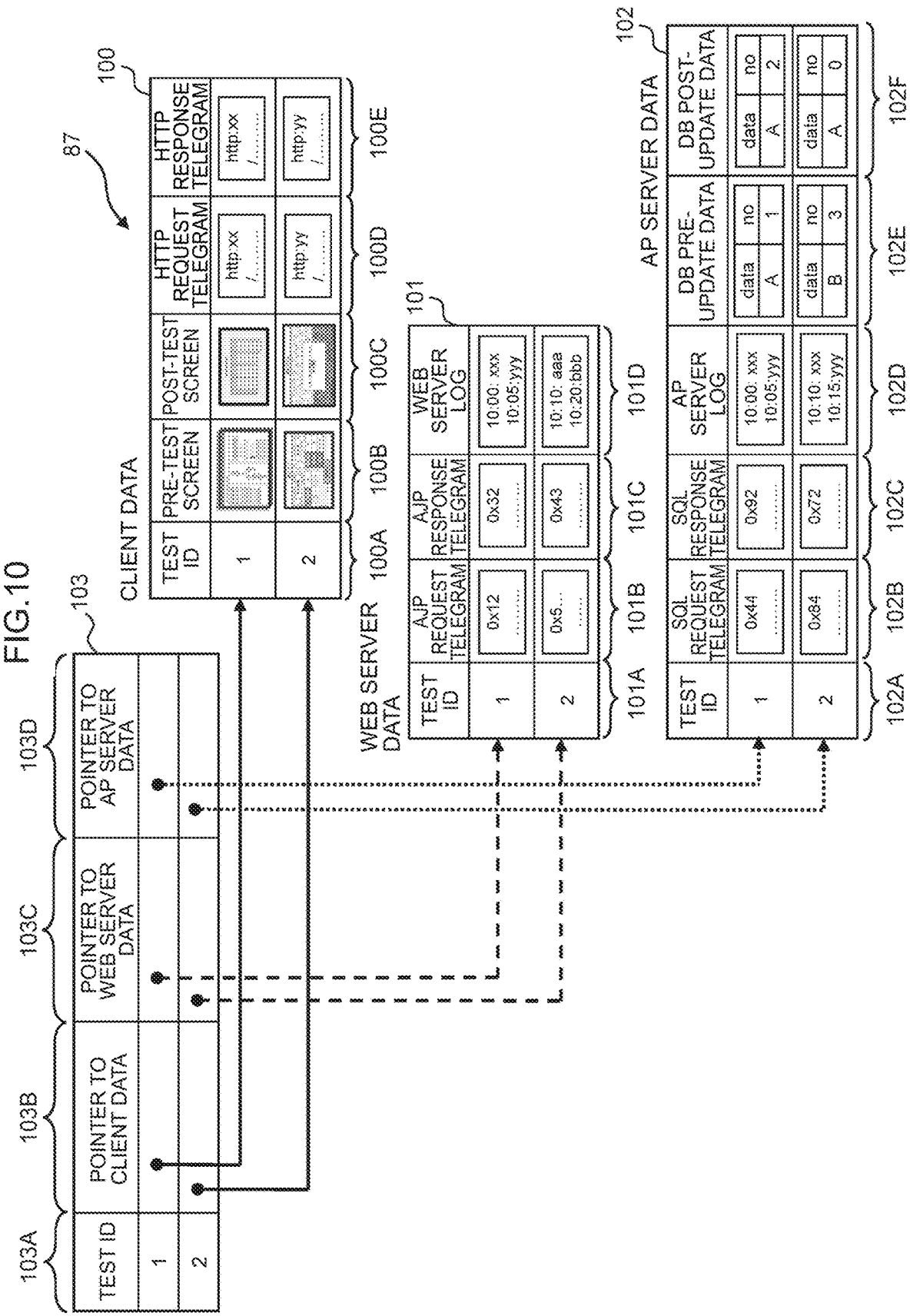

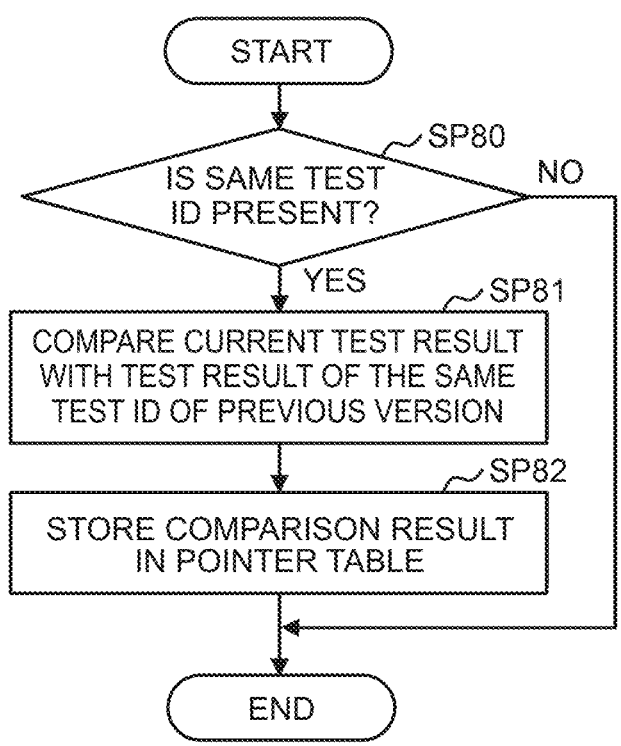

EVIDENCE GATHERING SYSTEM AND METHOD

TECHNICAL FIELD

The present invention relates to an evidence gathering system and method and, for instance, can be suitably applied when gathering evidence of test results in system testing of an order placement system used in a convenience store chain.

BACKGROUND ART

For instance, when a new convenience store is opened, a system test is conducted to determine whether it is possible to order a product correctly in the head office by using a client installed in the store. In such a system test, a test result report is created in order to report on test progress and check at a later date whether a leak has occurred in the test. Normally, this type of report gathers screen images, log information in each apparatus and telegrams exchanged between apparatuses, and the like, which are required by a test operative, as evidence items, and is created such that each of these gathered evidence items are printed altogether on a print medium.

Note that PTL 1 discloses a method for effectively performing an operation test on a POS terminal that is installed in a convenience store or supermarket and the like.

CITATION LIST

Patent Literature

[PTL 1] JP2015-169950

SUMMARY OF THE INVENTION

Technical Problem

Incidentally, this system test has been problematic in that, depending on the test content, the test operative must sometimes create a report by gathering evidence from test results spanning tens of thousands of items, and report creation takes a very long time. Moreover, such a conventional method for creating a report has been problematic not only in requiring a lot of paper but also in requiring space to save them.

The present invention was devised in view of the foregoing points and an object of this invention is to propose an evidence gathering system and method capable of reducing the burden on an operative performing system tests.

Solution to Problem

In order to achieve the foregoing object, the present invention is an evidence gathering system which gathers an evidence of a test result when a system test accompanying an update to a database in a system is executed, the system including a client, a first server apparatus which holds a database, and a second server apparatus which performs reading and writing of data from/to the database held by the first server apparatus, according to a request from the client, and the evidence gathering system comprises a first agent which is installed in the client and gathers the evidence of the test result in the client at the time of the system test, a second agent which is installed in the second server apparatus and gathers the evidence, of the test result in the second server apparatus at the time of the system test, which includes at least pre/post-update data of the database which has been updated as a result of the system test, and a test result integration apparatus which gathers the evidence in the client of the system test from the first agent, gathers the evidence in the second server apparatus of the system test from the second agent, and integrates the gathered evidence for each of the system tests.

Moreover, the present invention is an evidence gathering method for gathering evidence of a test result when a system test accompanying an update to the database in a system is executed, the system including a client, a first server apparatus which holds a database, and a second server apparatus which performs reading and writing of data from/to the database held by the first server apparatus, according to a request from the client, and the method, comprises a first step in which a first agent which is installed in the client gathers the evidence of the test result in the client at the time of the system test, a second agent which is installed in the second server apparatus gathers the evidence, of the test result in the second server apparatus at the time of the system test, which includes at least pre/post-update data of the database which has been updated as a result of the system test, and a second step in which a test result integration apparatus gathers the evidence in the client of the system test from the first agent, gathers the evidence in the second server apparatus of the system test from the second agent, and integrates the gathered evidence for each of the system tests.

According to the evidence gathering apparatus and method, the operative is able to gather evidence for each system test from the client and second server apparatus individually, which saves the operator the trouble of manually bringing together the gathered evidence for each system test.

Advantageous Effects of the Invention

According to the present invention, it is possible to realize an evidence gathering system and method capable of reducing the burden on an operative performing system tests.

BRIEF DESCRIPTION OF DRAWINGS

FIG. 6 is a conceptual drawing showing a configuration of a client screen data management table.

FIG. 7 is a conceptual drawing showing a configuration of an HTTP telegram management table.

FIG. 8 is a conceptual drawing showing a configuration of a web server log information management table.

FIG. 9 is a conceptual drawing showing a configuration of a pre/post-update database table management table.

FIG. 10 is a conceptual drawing showing a configuration of an integrated test result information management table group according to the first embodiment.

FIG. 20 is a flowchart showing the process steps of test compliance check processing.

DESCRIPTION OF EMBODIMENTS

An embodiment of the present invention will now be explained in detail with reference to the appended drawings.

Figure 1:
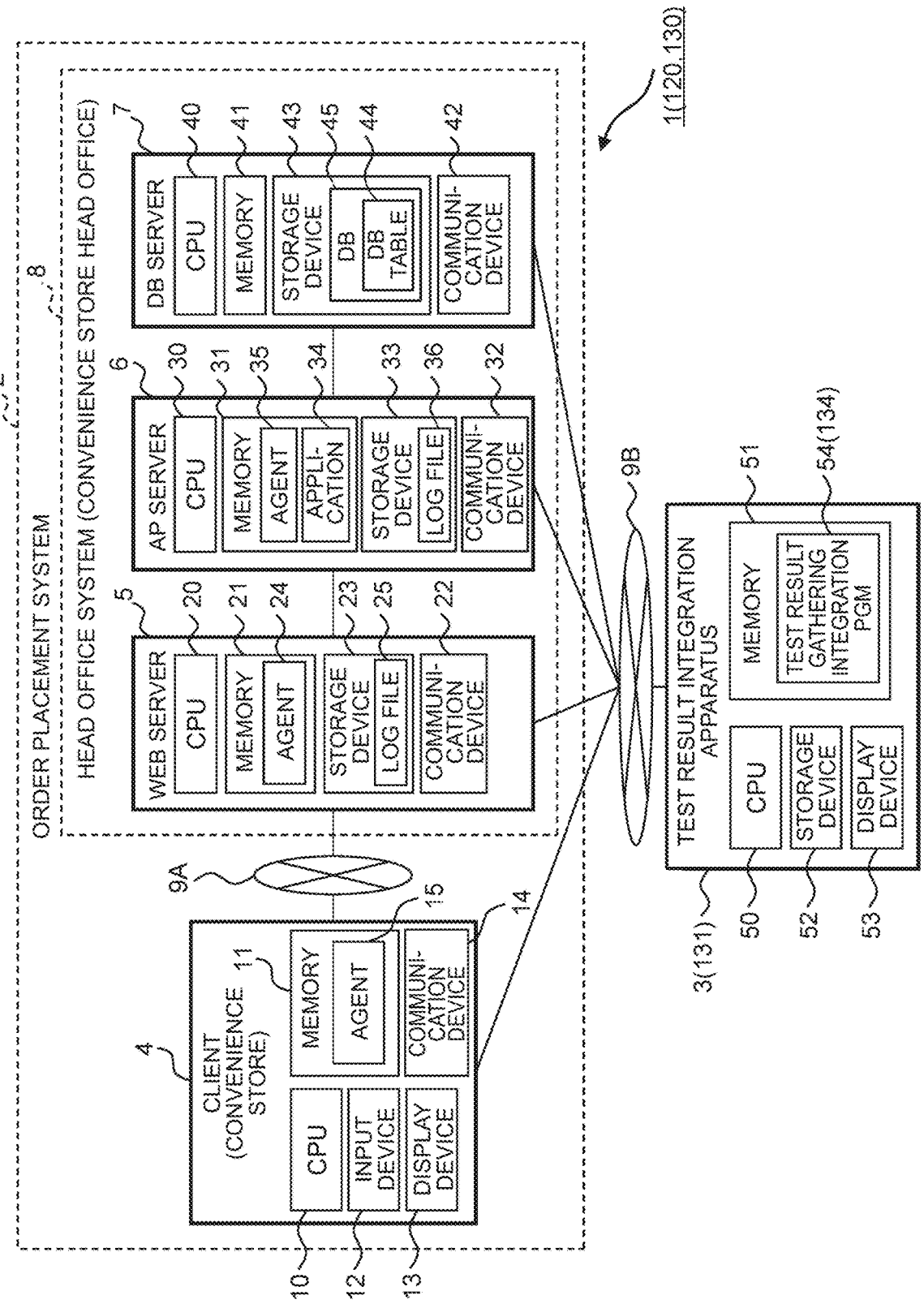
FIG. 1 is a block diagram showing an overall configuration of an information processing system according to the first to third embodiments.

(1) First Embodiment (1-1) Configuration of Information Processing System According to this Embodiment In FIG. 1, 1 denotes the overall information processing system according to this embodiment. This information processing system 1 is configured by comprising an order placement system 2 which is the subject of a system test (hereinafter a plurality of order placement tests are assumed), and a test result integration apparatus 3 which gathers and integrates the test results from the order placement system 2.

The order placement system 2 is configured from a client 4 which is installed in a new convenience store prior to store opening and a head office system 8 which comprises a web server 5, an application server 6, and a database server 7 which are installed in the head office of the convenience store chain.

The client 4 is configured from a CPU (Central Processing Unit) 10, a memory 11, an input device 12, a display device 13 and a communication device 14 and the like. The CPU 10 is a processor which is tasked with controlling the overall operation of the client 4. Moreover, in addition to being used to hold programs, the memory 11 may be used as the working memory of the CPU 10. The agent 15, described hereinbelow, is stored and held in the memory 11. The input device 12 is used by the user to input various information and is configured from a touch panel or a ten-key pad and the like, for example. The display device 13 is used to display various information and a liquid-crystal panel or an organic EL (electroluminescent) display, and the like, may be used, for example. The communication device 14 is configured from an NIC (Network Interface Card) and the like and performs protocol control during communication with the web server 5.

The web server 5 is a server apparatus which is connected via the client 4 and network 9A of each convenience store and comprises a function for receiving order placement requests sent from the client 4. The web server 5 is configured from an all-purpose server apparatus which comprises information processing resources such as a CPU 20, a memory 21, a communication device 22, and a storage device 23, and the like. An explanation of the functions and configurations of the CPU 20, memory 21 and communication device 22, which are the same as the functions and configurations of the CPU 10, memory 11 and communication device 14 of the client 4, is omitted. The agent 24, described hereinbelow, is stored in the memory 21 of the web server 5. The storage device 23 is configured from a high-capacity, non-volatile storage device such as a hard disk device or SSD (Solid State Drive), for example. The storage device 23 stores and holds log files 25 and the like for which log information is registered in a log generated by the web server 5.

The application server 6 is a server apparatus which comprises a function for updating, as required, a database 45 (described hereinbelow) which is held by the database server 7, according to an order placement request from the client 4 that is received by the web server 5. The application server 6 is configured from an all-purpose server apparatus which comprises information processing resources such as a CPU 30, a memory 31, a communication device 32, and a storage device 33. An explanation of the functions and configurations of the CPU 30, memory 31, communication device 32, and storage device 33, which are the same as the functions and configurations of the CPU 20, memory 21, communication device 22 and storage device 23 of the web server 5, is omitted. The memory 31 of the application server 6 stores, in addition to the application program 34 which updates, as required, the database 45 which is held by the database server 7, according to an order placement request from the client 4, an agent 35 which will be described subsequently. Moreover, the storage device 33 stores and holds log files 36 and the like for which log information is registered in a log generated by the application server 6.

The database server 7 is a server apparatus which comprises a function for managing and holding the database 45. The database server 7 is configured from an all-purpose server apparatus which comprises information processing resources such as a CPU 40, a memory 41, a communication device 42, and a storage device 43. An explanation of the functions and configurations of the CPU 40, memory 41, communication device 42, and storage device 43, which are the same as the functions and configurations of the CPU 20, memory 21, communication device 22 and storage device 23 of the web server 5, is omitted. The storage device 43 of the database server 7 stores the database 45 which comprises a plurality of database tables 44 relating to inventory information, and data I/O (Input/Output) to and from the database 45 is performed under the control of the CPU 40 according to requests from the application server 6.

Note that in the case of this embodiment, communication between each client 4 and web server 5 is performed according to the HTTP (Hypertext Transfer Protocol), communication between the web server 5 and application server 6 is performed according to the AJP (Apache Jserv Protocol), and communication between the application server 6 and database server 7 is performed by using SQL (Structure Query Language).

The test result integration apparatus 3 is connected via a network 9B to the client 4, the web server 5, the application server 6, and the database server 7, and is configured from a computer apparatus which comprises a CPU 50, a memory 51, a storage device 52 and a display device 53 and the like. An explanation of the functions and configurations of the CPU 50, memory 51, and communication device 52, which are the same as the functions and configurations of the CPU 20, memory 21, and storage device 23 of the web server 5, is omitted, and an explanation of the function and configuration of the display device 53, which are the same as the function and configuration of the display device 13 of the client 4, is omitted. A test result gathering integration program 54, described hereinbelow, is stored in the memory 51 of the test result integration apparatus 3.

(1-2) Test Result Gathering Integration Function

The test result gathering integration function installed in the test result integration apparatus 3 will be explained next. Foremost, an explanation of the order placement test that is implemented for the order placement system 2 according to this embodiment will be provided.

Figure 2:
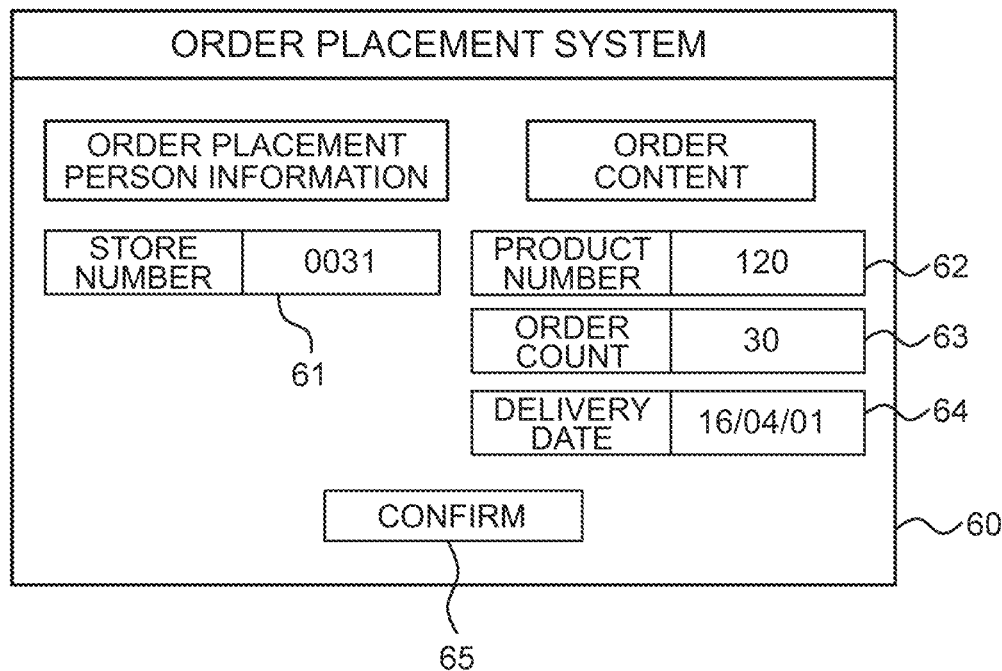
FIG. 2 is a schematic drawing schematically showing a screen configuration of an order placement screen.

In the case of this embodiment, the order placement test, which is implemented for the order placement system 2, is a test in which the operative performs an order operation by using the order placement screen 60 shown in FIG. 2, for example, which is displayed on the client 4, and, according to a prescribed check list, repeatedly checks (plural times) whether order fulfillment processing has been performed correctly in the head office system 8 based on the order operation.

Specifically, displayed on the order placement screen 60 as a text box for inputting purchaser information is a store number input text box 61 for inputting the store number of the convenience store where the client 4 is installed, and as textboxes for inputting order content, a product number input text box 62 for inputting the product number of the product to be purchased, an order count input textbox 63 for inputting the order count of the product, and a delivery date input textbox 64 for inputting the desired delivery date of the product, are displayed.

Figure 3:
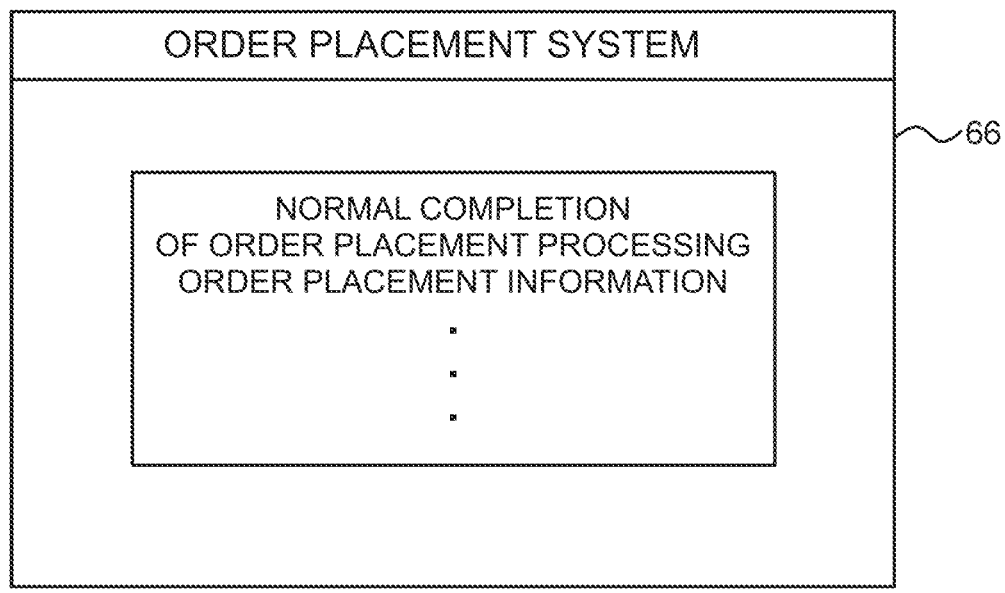
FIG. 3 is a schematic drawing schematically showing a screen configuration of an order completion screen.

Further, the order placement test operative inputs, in the store number input textbox 61 which is assigned to the convenience store where the client 4 is installed, a store number pertaining to the convenience store and, after inputting the product number, order count, and desired delivery date of a product in the above check list into the product number input text box 62, the order count input textbox 63, and the delivery date input textbox 64 respectively, places the order by clicking a confirm button 65. Thus, when product order fulfillment processing is performed correctly in the head system 8 in response to this order placement, the order placement completion screen 66 shown in FIG. 3, for example, which displays a message to the effect that order placement has been completed normally, is displayed on the display device 13 of the client 4.

In this case, in the order placement test, it is a requirement to collect, as test result evidence, screen data of the order placement screen 60 and order placement completion screen 66, data of telegrams which are exchanged at this time between the client 4 and web server 5, the web server 5 and application server 6, and the application server 6 and database server 7 respectively (hereinafter referred to as telegram data), logs which are generated in the web server 5 and application server 6 at this time, and pre/post-update data of target row in a database table 44 that has been targeted (hereinafter referred to as the target database table), in the database 45 that has been updated as a result of this order placement. Note that the target database 45 is dedicated to order placement tests and initially comprises predetermined content.

Thus, in the case of this information processing system 1, the test result integration apparatus 3 comprises a built-in test result gathering integration function which gathers the required evidence from the client 4, web server 5 and application server 6 respectively each time an order placement test is executed and integrates this gathered evidence as evidence for the order placement test. Moreover, installed on the client 4, and the web server 5 and application server 6 of the head office system 8 respectively are the agents 15, 24 and 35 which are programs for supporting the gathering of the required evidence by the test result integration apparatus 3.

Figure 4:
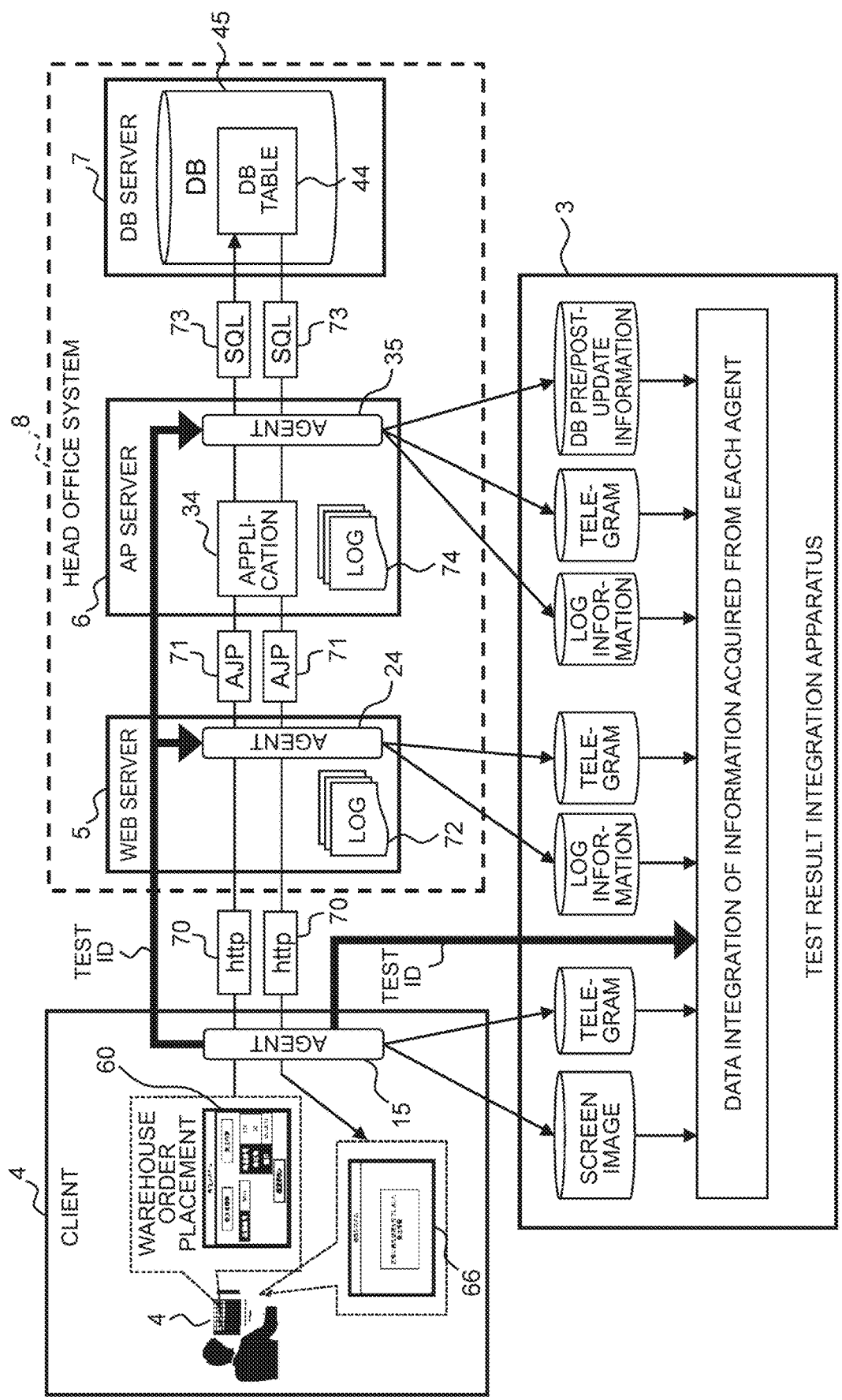
FIG. 4 is a conceptual drawing which schematically explains a test result gathering integration function.

Furthermore, as shown in FIG. 4, the agent 15 which is installed on the client 4 (hereinafter referred to as the client layout agent) sends notification of an identifier (hereinafter called the test ID), which pertains to the order placement and which was input when the operative executed the order placement test, to the agent 24 which is installed on the web server 5 (hereinafter referred to as the web server layout agent) and the agent 35 which is installed on the application server 6 (hereinafter referred to as the application agent).

Furthermore, at the time of an order placement test that is subsequently realized, the client layout agent 15 gathers, as evidence of this order placement test, the screen image data of the pre/post order placement screens (order placement screen 60 and order placement completion screen 66) which are displayed on the display device 13 of the client 4, and the telegram data of the HTTP-standard telegrams (hereinafter referred to as HTTP telegrams) 70 which have been exchanged with the web server 5 at the time of the order placement test, and stores and manages the gathered evidence in the memory 21 (FIG. 1) in association with the test ID of the order placement test. Furthermore, the client layout agent 15 sends this managed evidence to the test result integration apparatus 3 together with the test ID according to a request from the test result integration apparatus 3.

Meanwhile, at the time of an order placement test, the agent 24 which is installed on the web server 5 (hereinafter referred to as the web server layout agent) gathers the telegram data of AJP-standard telegrams (hereinafter referred to as AJP telegrams) 71 which the web server 5 has exchanged with the application server 6 and stores and manages the gathered telegram data in the memory 31 (FIG. 1) in association with the test ID of the prenotified order placement test. In addition, the web server layout agent 24 sends the managed telegram data and the data of each log (log information 72) which is generated in the web server 5 at the time of the order placement test to the test result integration apparatus 3 together with the test ID according to the request from the test result integration apparatus 3 as evidence of the order placement test.

Moreover, at the time of an order placement test, the agent 35 which is installed on the application server 6 (hereinafter referred to as the application server layout agent) gathers the telegram data of the SQL-standard telegrams (hereinafter referred to as SQL telegrams) 73 which the application server 6 has exchanged with the database server 7 and the pre/post update data of the target row in the target database table 44 when the target database table 44 of the database 45 is updated, and stores and saves the gathered data in the memory 41 (FIG. 1) in association with the test ID of the prenotified order placement test. In addition, the application server layout agent 35 sends this saved data and the log information 74 of each log generated in the application server 6 at the time of an order placement test as evidence of this order placement test to the test result integration apparatus 3 together with the test ID according to a request from the test result integration apparatus 3.

The test result integration apparatus 3 issues a request to the client layout agent 15, web server layout agent 24, and application server layout agent 35 to send evidence of the then conducted order placement test in response to notification of the end of an order placement test (hereinafter referred to as a test end notification) which is supplied from the client layout agent 15 according to an instruction from the operative each time an order placement test ends.

Moreover, the test result integration apparatus 3 stores and manages each evidence item of the order placement test which has been sent from the client layout agent 15, web server layout agent 24 and application server layout agent 35 according to this request, in the storage device 52 (FIG. 1).

Thereafter, the test result integration apparatus 3 integrates evidence by aggregating each of the evidence items stored in the storage device 52 which have the same test ID, and thus generates test result evidence for each order placement test.

Figure 5:
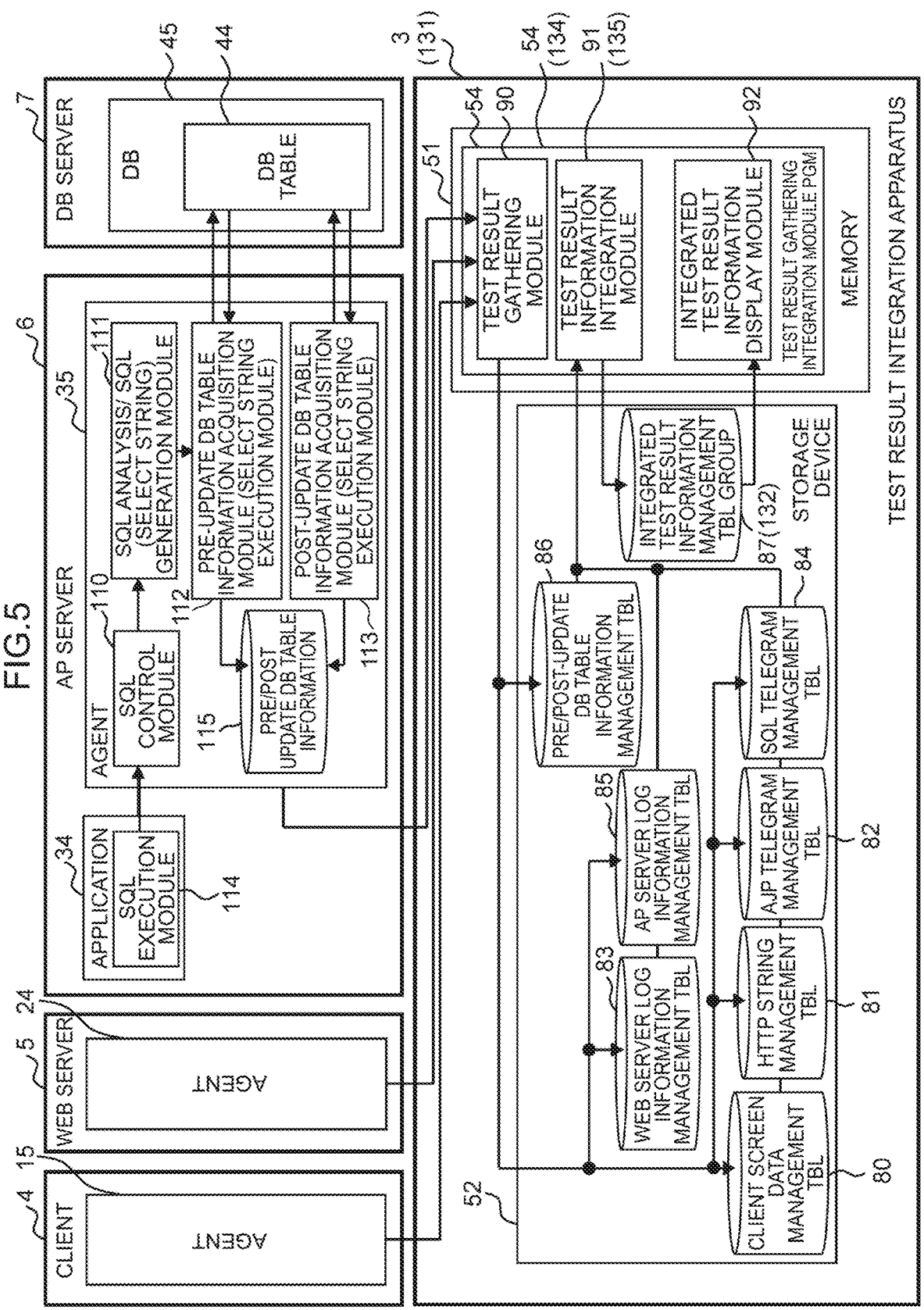
FIG. 5 is a block diagram which provides a detailed explanation of an application server layout agent and a test result integration apparatus.

As means for realizing the test result gathering integration function according to this embodiment, as shown in FIG. 5, the memory 51 of the test result integration apparatus 3 stores the test result gathering integration program 54, and the storage device 52 of the test result integration apparatus 3 stores a client screen data management table 80, an HTTP telegram management table 81, an AJP telegram management table 82, a web server log information management table 83, an SQL telegram management table 84, an application server log information management table 85, a pre/post update database table information management table 86, and an integrated test result information management table group 87.

The test result gathering integration program 54 is configured from a test result gathering module 90, a test result information integration module 91, and an integrated test result information display module 92. The test result gathering module 90 is a module which comprises a function for gathering the required evidence from the client 4, web server 5 and application server 6 respectively for each order placement test, and the test result information integration module 91 is a module which comprises a function for integrating this gathered evidence for each order placement test. Moreover, the integrated test result information display module 92 is a module which comprises a function for displaying the integrated evidence of each order placement test on the display device 53 (FIG. 1) according to a request from the operative.

Moreover, the client screen data management table 80 is a table which is used to store and manage the data of the screen image of the order placement screen 60 (FIG. 2) and the data of the screen image of the order placement completion screen 66 (FIG. 3), at the time the confirm button 65 (FIG. 2) is clicked, which the test result gathering module 90 has gathered from the client layout agent 15, and, as shown in FIG. 6, is configured by comprising a test ID field 80A, an acquisition time field 80B, a pre/post-order placement field 80C, and a screen data field 80D.

The test ID field 80A stores the test ID of the order placement test for which screen image data of the corresponding screen (the order placement screen 60 or order placement completion screen 66) has been acquired, while the acquisition time field 80B stores the time when the screen image data of the corresponding screen was acquired. Moreover, the pre/post-order placement field 80C stores information indicating that the corresponding screen is the pre-order placement screen (that is, the order placement screen 60) or the post-order screen (that is, the order placement completion screen 66). Moreover, in the case of this embodiment, when the corresponding screen is the order placement screen 60, 'pre-order' is stored in the pre/post-order placement field 80C, whereas when the corresponding screen is the order placement completion screen 66, 'post-order' is stored in the pre/post-order placement field 80C. Furthermore, the screen data field 80D stores the screen image data of the corresponding screen.

Moreover, the HTTP telegram management table 81 is a table which is used to manage the telegram data of the HTTP telegrams 70 (FIG. 4) which are exchanged between the client 4 and the web server 5 at the time of an order placement test, which the test result gathering module 90 has gathered from the client layout agent 15, and, as shown in FIG. 7, is configured by comprising a test ID field 81A, a send/receive time field 81B, a telegram type field 81C, and a telegram content field 81D.

The test ID field 81A stores the test ID of the order placement test that is conducted when the corresponding HTTP telegram 70 is exchanged, and the send/receive time field 81B stores the time the HTTP telegram 70 was exchanged between the client 4 and the web server 5. Moreover, the telegram type field 81C stores information indicating whether the HTTP telegram 70 was sent from the same device (the client 4 here) to a partner device (here, the web server 5) or was sent from the partner device to the same device. In the case of this embodiment, 'request' is stored when the corresponding HTTP telegram 70 was sent to the partner device and 'response' is stored when the HTTP telegram 70 was sent from the partner device. Further, the telegram content field 81D stores the HTTP telegram 70 in an as-is state (HTTP format packet state).

Note that a detailed explanation of the configurations of the AJP telegram management table 82 and the SQL telegram management table 84, which are the same as the configuration of the HTTP telegram management table 81, is omitted.

The web server log information management table 83 is a table which is used to store and manage the log information of each log generated by the web server 5, at the time of an order placement, which the test result gathering module 90 has gathered from the client layout agent 24, and, as shown in FIG. 8, is configured by comprising a test ID field 83A, a log update time field 83B, a file name field 83C, and a log data field 83D.

The test ID field 83A stores the test ID of the order placement test that is conducted when the corresponding log is generated, and the log update time field 83B stores the time the corresponding log was generated and stored in the log file 25 (FIG. 1). Moreover, the file name field 83C stores the file name of the log file 25 where the corresponding log is stored, and the log data field 83D stores the actual data of the corresponding log as is.

Note that a detailed explanation of the configuration of the application server log information management table 85, which is the same as the configuration of the web server log information management table 83, is omitted.

The pre/post-update database table information management table 86 is a table which is used to store and manage the pre/post-update content of the target row of the target database table 44, updated as a result of an order placement test, which the test result gathering module 90 has gathered from the application server layout agent 35, and, as shown in FIG. 9, is configured by comprising a test ID field 86A, an acquisition time field 86B, a telegram type field 86C, a telegram content field 86D, a pre/post-update field 86E, a target database table field 86F, and a target row pre/post-update content field 86G.

The test ID field 86A stores the test ID of the order placement test that was conducted when the corresponding target database table 44 has been updated, and the acquisition time field 86B stores the time the data of the target row of the target database table 44 was acquired.

Moreover, the telegram type field 86C stores information indicating whether the SQL telegram when acquiring the data of the target row of the target database table 44 was sent from the application server 6 to the database server 7 or sent from the database server 7 to the application server 6 ('request' is stored when the telegram was sent from the application server 6 to the database server 7, and 'response' is stored when the telegram was sent from the database server 7 to the application server 6), and the telegram content field 86D stores information representing the content of the SQL telegram 73 (FIG. 4). Note that, as information representing the telegram content, there exist 'update,' which signifies a target row update, 'insert,' which signifies a target row entry, and 'delete,' which denotes target row deletion, and the like.

Additionally, the pre/post-update field 86E stores information indicating whether the target row data of the target database table 44 corresponding to a record in the pre/post-update database table information management table 86 is pre-update or post-update data ('pre-update' is stored for pre-update data and 'post-update' for post-update data). The target table field 86F stores the identifier of the target database table 44 corresponding to this record, and the target row pre/post-update content field 86G stores pre-update or post-update data of the target row of the target database table 44.

As shown in FIG. 10, the integrated test result information management table group 87 is configured from a client data table 100, a web server data table 101, an application server data table 102, and a pointer table 103.

The client data table 100 is a table which aggregates, for each order placement test, screen image data of each order placement screen 60 and each order placement completion screen 66 which is stored in the client screen data management table 80, and telegram data of the HTTP telegrams 70 (FIG. 4) which are exchanged between the client 4 and the web server 5 which is stored in the HTTP telegram management table 81, and is configured by comprising a test ID field 100A, a pre-test screen field 100B, a post-test screen field 100C, an HTTP request telegram field 100D, and an HTTP response telegram field 100E.

Further, the test ID field 100A stores the test IDs which have been assigned to each order placement test. Moreover, the pre-test screen field 100B stores the screen image data of the corresponding order placement screen 60 which was acquired at the time of order placement, while the post-test screen field 100C stores the screen image data of the corresponding order placement completion screen 66 which was acquired at the time of order placement. Moreover, the HTTP request telegram field 100D stores telegram data of the HTTP telegrams 70 (order placement request telegrams) which the client 4 sends to the web server 5 at the time of an order placement test, and the HTTP response telegram field 100E stores telegram data of the HTTP telegrams 70 (telegrams in response to the order placement request) which the client 4 receives from the web server 5 at the time of the order placement test.

Moreover, the web server data table 101 is a table which aggregates, for each order placement test, telegram data of the AJP telegrams 71 (FIG. 4), exchanged between the web server 5 and application server 6, which is stored in the AJP telegram management table 82, and log information 72 (FIG. 4), for each log generated in the web server 5, which is stored in the web server log information management table 83 and is configured by comprising a test ID field 101A, an AJP request telegram field 101B, an ALP response telegram field 101C, and a web server log field 101D.

Further, the test ID field 101A stores the test IDs which have been assigned to each order placement test. Moreover, the AJP request telegram field 101B stores telegram data of the AJP telegrams 71 which the web server 5 has sent to the application server 6 in response to a corresponding order placement request from the client 4 at the time of an order placement test, and the AJP response telegram field 101C stores telegram data of the AJP telegrams 71 which have been sent from the application server 6 to the web server 5 in response to the order placement request at the time of the order placement test. Furthermore, the web server log field 101D stores log information 72 for each log which is generated in the web server 5 at the time of the order placement test.

Moreover, the application server data table 102 is a table which aggregates, for each order placement test, the telegram data of the SQL telegrams 73 (FIG. 4), exchanged between the application server 6 and the database server 7, which is stored in the SQL telegram management table 84, the log information 74 (FIG. 4), for each log generated in the application server 6, which is stored in the application server log information management table 85, and the data of the pre/post-update database table 44 which is stored in the pre/post-update database table information management table 86, and is configured by comprising a test ID field 102A, an SQL request telegram field 102B, an SQL response telegram field 102C, an application server log field 102D, a database pre-update data field 102E, and a database post-update data field 102F.

Further, the test ID field 102A stores the test IDs which have been assigned to each order placement test. Moreover, the SQL request telegram field 102B stores telegram data of the SQL telegrams 73 (FIG. 4) which the application server 6 has sent to the database server 7 in response to an order placement request from the client 4 at the time of a corresponding order placement test, and the SQL response telegram field 102C stores telegram data of the SQL telegrams 73 which have been sent from the database server 7 to the application server 6 in response to the SQL telegrams.

Furthermore, the application server log field 102D stores the log information 74 (FIG. 4) for each log which is generated in the web server 5 at the time of the corresponding order placement test. Additionally, the database pre-update data field 102E stores pre-update data of the target row of the target database table 44 at the time of the order placement test, and the database post-update data field 102F stores post-update data of the target row of the target database table 44 at the time of the order placement test.

The pointer table 103 is a table which is used to manage pointer data pointing at a record for each order placement test in the client data table 100, the web server data table 101, and the application server data table 102, and is configured by comprising a test ID field 103A, a first pointer field 103B, a second pointer field 103C, and a third pointer field 103D.

Further, the test ID field 103A stores the test IDs which have been assigned to each order placement test. Moreover, the first pointer field 103B stores a pointer pointing at the record for the corresponding order placement test in the client data table 100, the second pointer field 103C stores a pointer pointing at the record for the order placement test in the web server data table 101, and the third pointer field 103D stores a pointer pointing at the record (row) for the order placement test in the application server data table 102.

Meanwhile, within the test result gathering integration function, and in particular as means for realizing a function for acquiring the pre/post-update data of the target row of the target database table 44, the application server layout agent 35 is, as shown in FIG. 5, configured by comprising an SQL control module 110, an SQL analysis/SQL generation module 111, a pre-update database table information acquisition module 112, and a post-update database table information acquisition module 113.

The SQL control module 110 is a module which comprises a function for controlling the SQL analysis/SQL generation module 111 by detecting an SQL command which the SQL execution module 114 of the application program 34 has issued to update the desired database table 44. Moreover, the SQL analysis/SQL generation module 111 is a module function which, upon receipt of an instruction from the SQL control module 110, analyzes the SQL commands which the SQL execution unit 114 of the application program 34 has issued, and generates a select string to extract the target row in the database table 44 being targeted.

The pre-update database table information acquisition module 112 is a module which comprises a function for acquiring the database table 44 targeted by the SQL command which the SQL execution module 114 of the application program 34 has generated, and pre-update data of the target row, according to the select string generated by the SQL analysis/SQL generation module 111. Moreover, the post-update database table information acquisition module 113 is a module which comprises a function for acquiring post-update data of the target row of the database table 44 targeted by the SQL command which the SQL execution module 114 of the application program 34 has generated, according to the select string generated by the SQL analysis/SQL generation module 111.

The specific processing flow of each module of the application server layout agent 35 will be described subsequently.

(1-3) Various Processing Relating to the Test Result Gathering Integration Function The specific processing content of various processing that is executed by the client layout agent 15, web server layout agent 24, application server layout agent 35, and test result integration apparatus 3 in connection with the test result gathering integration function according to this embodiment, will be shown next. Note that, in the ensuing explanation, although the processing entities of the various processing may be explained as 'agents' or 'modules', in reality, it goes without saying that the CPUs 10, 20 and 30 of the client 4, web server 5, and application server 6 execute this processing based on the 'agents' and 'modules' and the like.
(1-3-1) Processing of the Client Layout Agent.

Figure 11:
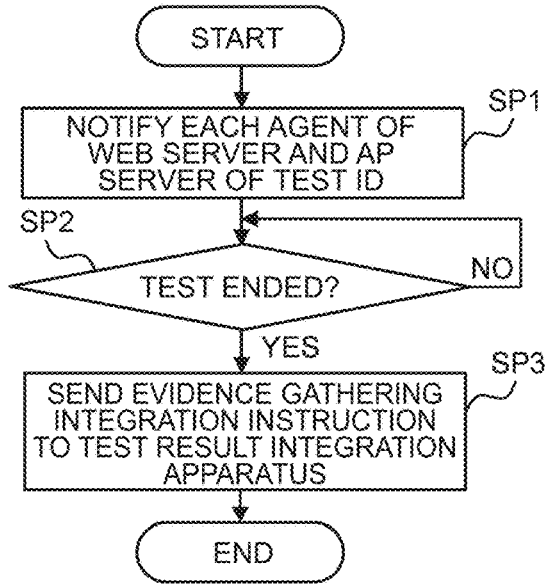
FIG. 11 is a flowchart showing the process steps of test start/finish processing.

FIG. 11 is a flowchart showing the processing content of test start/finish processing that is executed by the client layout agent 15 when, upon starting an order placement test, an operative uses a predetermined screen (not shown), displayed by performing a predetermined operation on the client 4, to set the test ID of the order placement test, and inputs an instruction to start the order placement test.

When the test ID of the order placement test is input to this predetermined screen, and the operation to instruct the start of the order placement test is performed, the client layout agent 15 starts the test start/finish processing shown in FIG. 11, and foremost sends notification of the test ID, input at this time, to the web server layout agent 24 and the application server layout agent 35 (SP1).

Thereafter, the client layout agent 15 determines whether the order placement test executed at this time has ended (SP2). This determination is made by determining whether, after the operative has performed the order placement operation by using the order placement screen 60 in FIG. 2, information to the effect that the order placement test has ended has been input by the operative.

Further, when information to the effect that the order placement test has ended is input before long by the operative, the client layout agent 15 sends notification that the order placement test has ended (hereinafter referred to as the test end notification) to the test result integration apparatus 3 (SP3), and then ends the test start/finish processing.

Figure 12:
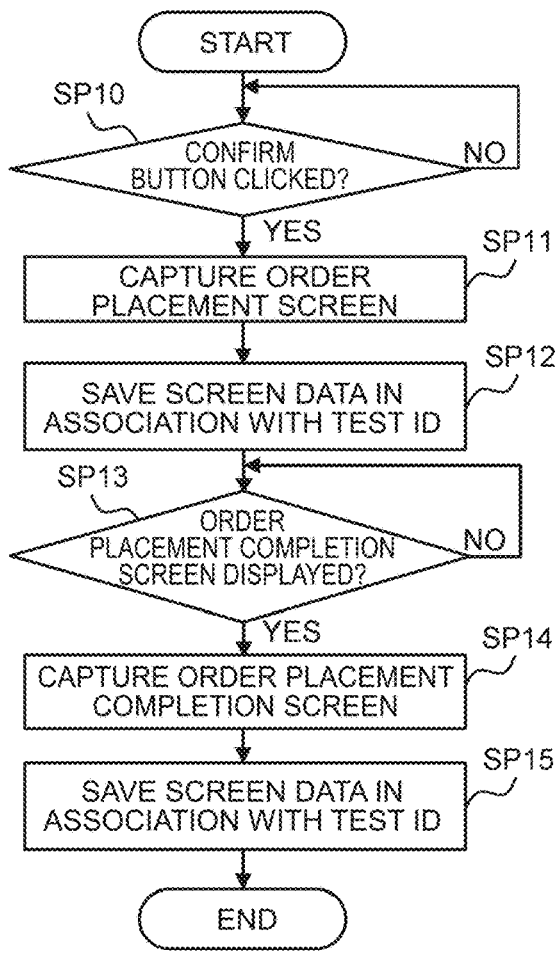
FIG. 12 is a flowchart showing the process steps of screen data acquisition processing.

Meanwhile, FIG. 12 shows the process steps of screen data acquisition processing that is executed by the client layout agent 15 concurrently with the test start/finish processing. The client layout agent 15 acquires the screen image data of the order placement screen 60 and order placement completion screen 66 when the order placement test is conducted, according to these process steps.

In reality, when, after the order placement test has started, the order placement screen 60 is displayed by the predetermined operation, the client layout agent 15 starts the screen data acquisition processing shown in FIG. 12 and foremost waits for the confirm button 65 (FIG. 2) of the order placement screen 60 to be clicked (SP10).

Further, when the confirm button 65 is clicked after the required items have been input to the store number input textbox 61 (FIG. 2), the product number input text box 62 (FIG. 2), the order count input textbox 63 (FIG. 2), and the delivery date input textbox 64 (FIG. 2) respectively of the order placement screen 60 (FIG. 2), the client layout agent 15 captures the order placement screen 60 at this point in time (SP11) and saves this screen image data, the time, and information indicating that the screen image is a screen preceding order placement (order placement screen 60), in the memory 11 in association with the test ID of the order placement test being conducted at this time (SP12).

Thereafter, the client layout agent 15 receives a response, from the web server 5, regarding product order placement using the order placement screen 60 and waits for the order placement completion screen 66 to be displayed on the client 4 (SP13).

Furthermore, when this order placement completion screen 66 is displayed before long on the client 4, the client layout agent 15 captures the order placement completion screen 66 at this point in time (SP14), and saves this screen image data, the time, and information indicating that the screen image is a screen after order placement (order placement completion screen 66), in the memory 11 in association with the test ID of the order placement test being conducted at this time (SP15). The client layout agent 15 then ends the screen data acquisition processing.

Figure 13:
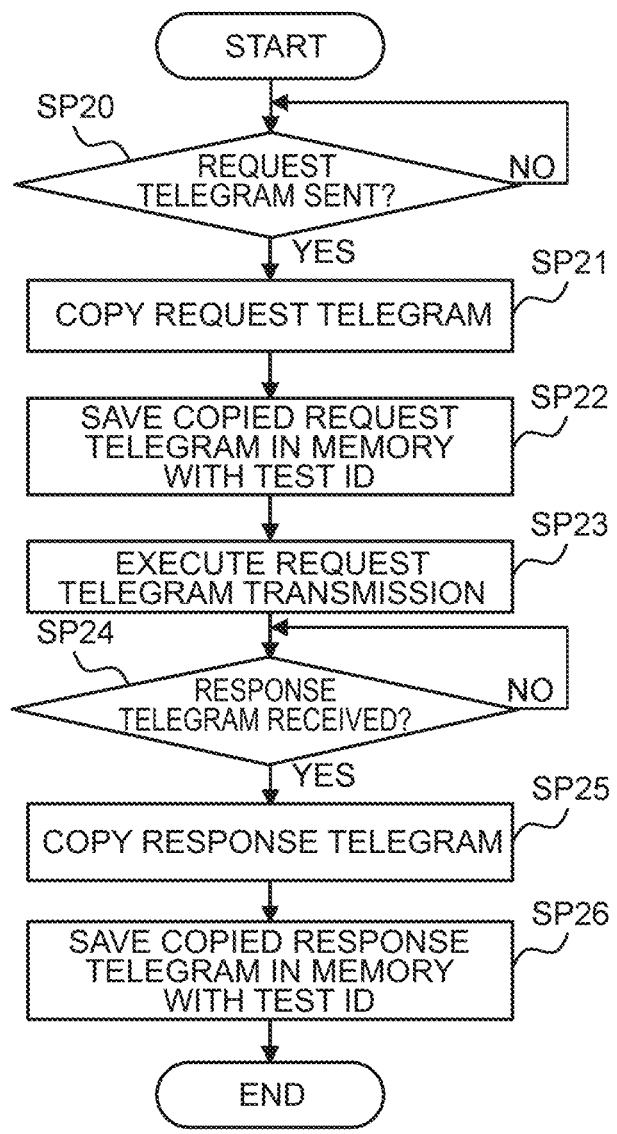
FIG. 13 is a flowchart showing the process steps of telegram data acquisition processing that is executed by the client layout agent.

Meanwhile, FIG. 13 shows the process steps of telegram data acquisition processing that is executed by the client layout agent 15 concurrently with the test start/finish processing (FIG. 11) and screen data acquisition processing (FIG. 12). The client layout agent 15 acquires telegram data of the HTTP telegrams 70 (FIG. 4) which are exchanged between the client 4 and the web server 5 at the time of an order placement test, according to these process steps.

In reality, when the order placement test is started, the client layout agent 15 starts the telegram data acquisition processing, and foremost waits for the confirm button 65 to be clicked after the required items have been input to the store number input textbox 61, the product number input text box 62, the order count input textbox 63, and the delivery date input textbox 64 respectively of the order placement screen 60 (SP20).

Furthermore, when before long a condition where the HTTP telegram (request telegram) 70 has been sent from the client 4 to the web server 5 is detected, the client layout agent 15 copies the telegram data of the HTTP telegram 70 (SP21) and saves the copied telegram data of the HTTP telegram 70, the time, and the telegram type ('request' or 'response') in the memory 11 (FIG. 1) in association with the test ID of the order placement test being conducted at the time (SP22). The client layout agent 15 then sends the HTTP telegram 70 to the web server 5 (SP23).

Thereafter, the client layout agent 15 waits for a condition where a HTTP telegram 70 constituting a response to the HTTP telegram 70 has been sent from the web server 5 (SP24), and when before long the communication device 14 receives this HTTP telegram 70, acquires the telegram data of the HTTP telegram 70 from the communication device 14 and copies this data (SP25), and saves the copied telegram data of the HTTP telegram 70, the time, and the telegram type in the memory 11 in association with the test ID of the order placement test being conducted at the time (SP26). The client layout agent 15 then ends the telegram data acquisition processing.

(1-3-2) Processing of the Web Server Layout Agent.

Figure 14:
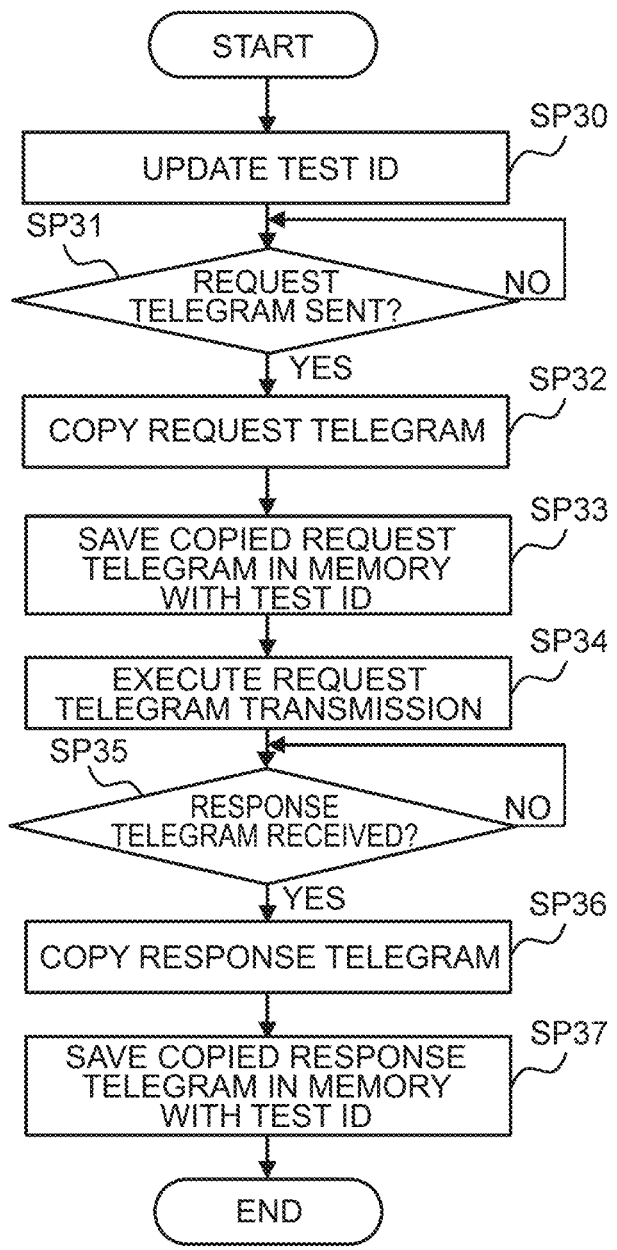
FIG. 14 is a flowchart showing the process steps of telegram data acquisition processing that is executed by the web server layout agent.

Meanwhile, FIG. 14 shows the specific processing content of telegram data acquisition processing that is executed by the web server layout agent 24 in connection with the test result gathering integration function according to this embodiment. The web server layout agent 24 acquires and saves telegram data of the AJP telegrams 71 (FIG. 4) which are exchanged with the application server 6 according to the process steps shown in FIG. 14, at the time of an order placement test.

In reality, when the test ID has been sent from the client layout agent 15, the web server layout agent 24 starts the telegram data acquisition processing shown in FIG. 14, and foremost updates the test ID which the web server layout agent 24 holds to the received test ID (SP30).

Thereafter, the web server layout agent 24 waits for the AJP telegram 71 in response to the HTTP telegram 70 sent by the web server 5 to the client 4 to be sent to the application server 6 (SP31).

When before long this AJP telegram 71 is to be sent by the web server 5 to the application server 6, the web server layout agent 24 copies the telegram data of the AJP telegram 71 (SP32) and saves the copied telegram data of the AJP telegram 71, the time, and the telegram type in the memory 21 (FIG. 1) in association with the test ID of the order placement test being conducted at the time (SP33).

The web server layout agent 24 then sends the AJP telegram 71 to the application server 6 (SP34).

Thereafter, the web server layout agent 24 waits for a condition where the AJP telegram 71 in response to the AJP telegram 71 has been sent from the application server 6 (SP35), and when before long the web server 5 receives the AJP telegram 71, the web server layout agent 24 copies the telegram data of the AJP telegram 71 (SP36) and saves the copied telegram data of the AJP telegram 71, the time, and the telegram type in the memory 21 in association with the test ID of the order placement test being conducted at the time (SP37). The web server layout agent 24 then ends the telegram data acquisition processing.

(1-3-3) Processing of the Application Server Layout Agent.

Figure 15:
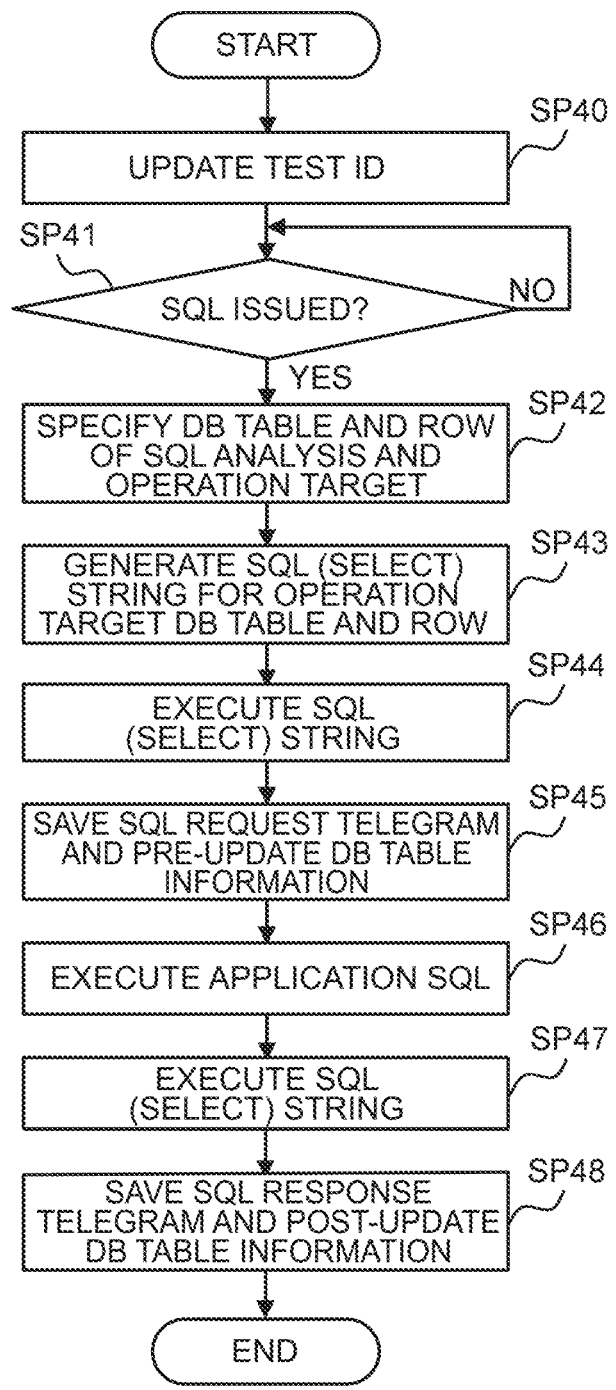
FIG. 15 is a flowchart showing the process steps of pre/post-update database table information acquisition processing.

Meanwhile, FIG. 15 shows the specific processing content of pre/post-update database table information acquisition processing that is executed in the application server layout agent 35 in connection with the test result gathering integration function according to this embodiment. The application server layout agent 35 acquires and saves pre/post-update information of the update target row in the database table 44 (FIG. 1) held by the database server 7 according to the process steps shown in FIG. 15, at the time of an order placement test.

In reality, when the test ID is sent from the client layout agent 15, the application server layout agent 35 starts the pre/post-update database table information acquisition processing shown in FIG. 15, and the SQL control module 110 (FIG. 5) foremost updates the test ID held by the application server layout agent 35 to the test ID received at this time (SP40).

Thereafter, the SQL control module 110 waits for a condition where the SQL execution module 114 (FIG. 5) issues an SQL telegram 73 (FIG. 4) to the database server 7, to update the target row in the target database table 44 held by the database server 7 according to the HTTP telegram 70 supplied by the web server 5 (SP41).

Furthermore, when the SQL execution unit 114 of the application program 34 is soon to issue the SQL telegram 73 and the application server 6 is about to send the SQL telegram 73 to the database server 7, the SQL control unit 110 issues an instruction to the SQL analysis/SQL generation unit 111 (FIG. 5) to analyze the content of the SQL telegram 73 after temporarily suppressing the sending of the SQL telegram 73 to the database server 7 (FIG. 5).

Thus, by analyzing the content of the SQL telegram 73, the SQL analysis/SQL generation module 111 which has received this instruction specifies the target row of the target database table 44 (SP42) and generates an SQL-standard select string to the effect that the information of this row of the database table 44 is to be acquired (SP43).

Thereafter, by sending this select string to the database server 7, the pre-update database table information acquisition module 112 (FIG. 5) acquires pre-update information of the target row of the target database table 44 (hereinafter referred to as pre-update database table information) (SP44), and stores the acquired pre-update database table information, the time, and the content of the SQL telegram 73 sent by the pre-update database table information acquisition module 112 to the database server 7 at the time, information indicating whether the SQL telegram was sent before or after updating the target database table 44, and the identifier of the target database table 44, in the pre/post-update database table information management table 115 that is held in the memory 31 (FIG. 1) in association with the test ID updated in step SP40 (SP45). Note that an explanation of the configuration of the pre/post update database table information management table 115, which is the same as the pre/post update database table information management table 86 described earlier with reference to FIG. 9 and held by the test result integration apparatus 3, is omitted.

Thereafter, the SQL telegram 73 generated by the SQL execution module 114 of the application program 34 is sent to the database server 7 (SP46).

Furthermore, when the operation on the target row of the target database table 44 targeted by the SQL telegram 73 is complete, by sending the select string generated by the SQL analysis/SQL generation module 111 in step SP43 to the database server 7, the post-update database table information acquisition module 113 (FIG. 5) acquires post-update information of the target row of the target database table 44 (hereinafter referred to as post-update database table information) (SP47), and stores the acquired post-update database table information, the time, and the content of the SQL telegram 73 sent by the post-update database table information acquisition module 113 to the database server 7 at the time, information indicating whether the SQL telegram was sent before or after updating the target database table 44, and the identifier of the target database table 44, in the pre/post-update database table information management table 115 that is held in the memory 31 (FIG. 1) in association with the test ID updated in step SP40 (SP48).

As a result of the foregoing, the pre/post-update database table information acquisition processing by the application server layout agent 35 ends.

Note that by executing telegram data acquisition processing, which is the same as the telegram data acquisition processing described earlier with reference to FIG. 14, in conjunction with this pre/post-update database table information acquisition processing, the application server layout agent 35 acquires the copy of the telegram data of the SQL telegram 73 exchanged with the database server 7, and saves the copied telegram data in the memory 31 in association with the test ID of the order placement test being conducted at the time.

(1-3-4) Processing of Test Result Gathering Integration Program.

(1-3-4-1) Processing of Test Result Gathering Module.

Figure 16:
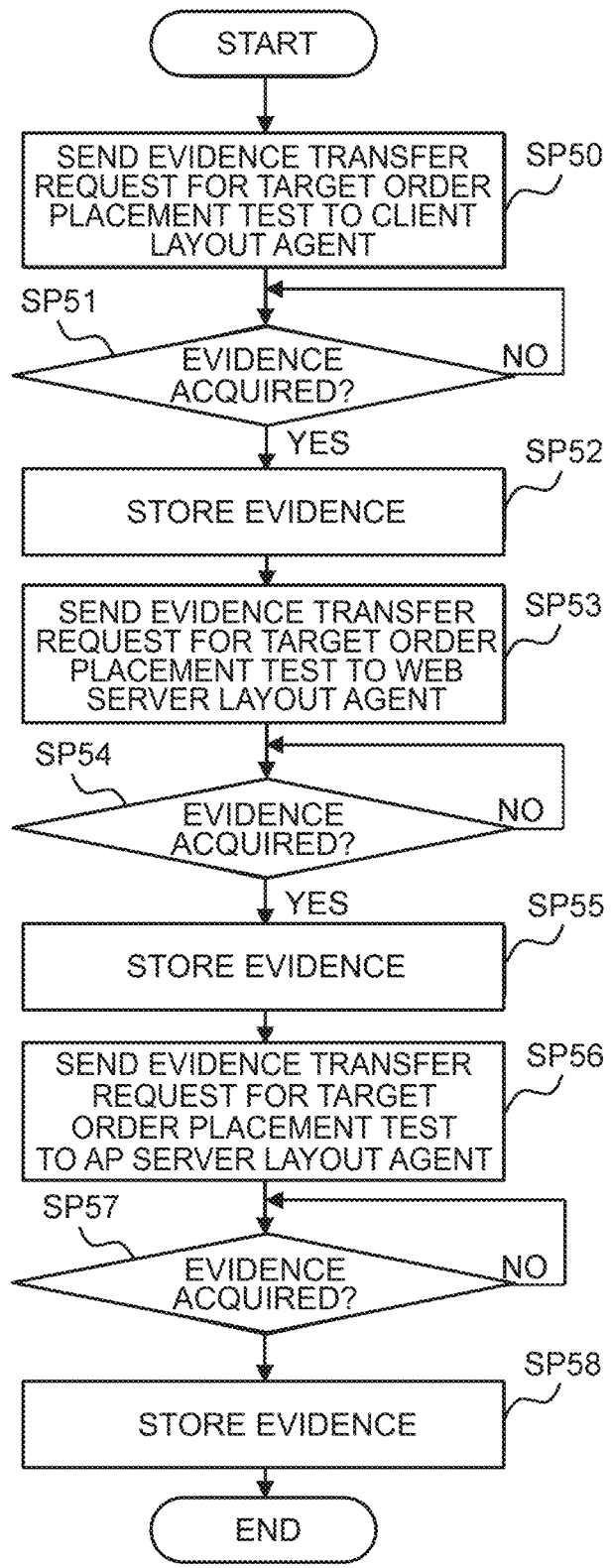
FIG. 16 is a flowchart showing the process steps of test result gathering processing.

FIG. 16 is a flowchart showing the processing content of test result gathering processing that is executed by the test result gathering module 90 (FIG. 5) in the test result gathering integration program 54 (FIG. 5) which is installed on the test result integration apparatus 3. The test result gathering module 90 gathers evidence for each order placement test from each of the client 4, the web server 5, and the application server 6 according to the process steps shown in FIG. 16.

In reality, upon receiving the aforementioned test end notification which is sent from the client layout agent 15 each time an order placement test ends, the test result gathering module 90 starts the test result gathering processing shown in FIG. 16 and foremost sends an evidence transfer request to the client layout agent 15 to the effect that the gathered test result evidence for the placement test that has ended is to be sent (SP50). Note that the evidence transfer request contains the test ID of the order placement test that was notified by the client layout agent 15 at the start of the order placement test. The test result gathering module 90 subsequently waits for the evidence to be sent from the client layout agent 15 (SP51).

At this time, the client layout agent 15, which has received the evidence transfer request, reads various information relating to the order placement screen 60 and order placement completion screen 66 that was acquired at the time of the order placement test (the screen image data for each screen, the time the screen was captured, and information indicating whether the screen precedes or follows order placement), information relating to the HTTP telegram 70 which was exchanged with the web server 5 at the time of the order placement test (the send/receive time of the HTTP telegram 70, the telegram type, and the telegram data itself), from the memory 11 (FIG. 1), and sends this read data to the test result integration apparatus 3 in association with the test ID of the order placement test.

Thus, the test result gathering module 90 of the test result integration apparatus 3 which has received this data stores, among the received data, information relating to the order placement screen 60 and the order placement completion screen 66, in the client screen data management table 80, and stores information relating to the HTTP telegram 70 in the HTTP telegram management table 81 (SP52).

Thereafter, the test result gathering module 90 sends the evidence transfer request to the web server layout agent 24 (SP53), and then waits for the evidence to be sent from the web server layout agent 24 (SP54).

At this time, the web server layout agent 24, which has received the evidence transfer request, reads information relating to the AJP telegram 71 that was exchanged with the application server 6 at the time of the order placement test (the send/receive time of the AJP telegram 71, the telegram type, and the telegram data itself), from the memory 21 (FIG. 1), and sends this read data to the test result integration apparatus 3 in association with the test ID of the order placement test.

Moreover, the web server layout agent 24 also reads log information for each log generated from a time which is a predetermined period (one minute, for example) before the time the very first AJP telegram 71 (request telegram) was sent to the application server 6 at the time of the order placement test, until the time the AJP telegram 71 was sent from the application server 6 in response to the AJP telegram 71 (response telegram), from the log file 25 (FIG. 1), and sends this log information to the test result integration apparatus 3.

Thus, the test result gathering module 90 of the test result integration apparatus 3 which has received this data stores, among the received data, information relating to the AJP telegram 71, in the AJP telegram management table 82, and stores log information of each log in the web server log information management table 83 (SP55).

Thereafter, the test result gathering module 90 sends the evidence transfer request to the application server layout agent 35 (SP56), and then waits for the evidence to be sent from the application server layout agent 35 (SP57).

At this time, the application server layout agent 35, which has received the evidence transfer request, reads information relating to the SQL telegram 73 that was exchanged with the database server 7 at the time of the order placement test (the send/receive time of the SQL telegram 73, the telegram type, and the telegram data itself), from the memory 31 (FIG. 1), and sends this read data to the test result integration apparatus 3 in association with the test ID of the order placement test.

Moreover, the application server layout agent 35 also reads log information for each log generated from a time which is a predetermined period (one minute, for example) before the time the very first SQL telegram 73 (request telegram) was sent to the database server 7 at the time of the order placement test, until the time the SQL telegram 73 was sent from the database server 7 in response to the SQL telegram 73 (response telegram), from the log file 36 (FIG. 1), and sends this log information to the test result integration apparatus 3.

Moreover, the application server layout agent 35 also reads information relating to pre/post-update content of the target row of the target database table 44 (such as information relating to the pre-update content and post-update content of the target row respectively, the times each of these information items were acquired, the content and telegram type of the SQL telegram 73 which was sent from the application server 6 to the database server 7 when acquiring this information, and the identifier of the target database table 44) from the memory 31, and sends this read data to the test result integration apparatus 3 in association with the test ID of the order placement test.

Thus, the test result gathering module 90 of the test result integration apparatus 3 which has received this data stores, among the received data, information relating to the SQL telegram 73, in the SQL telegram management table 84, stores the log information of each log in the application server log information management table 85, and stores data relating to the pre/post update content of the target row of the target database table 44, in the pre/post update database table information management table 86 (SP58).

The test result gathering module 90 then ends the test result gathering processing.

(1-3-4-2) Processing of Test Result Information Integration Module.

Figure 17:
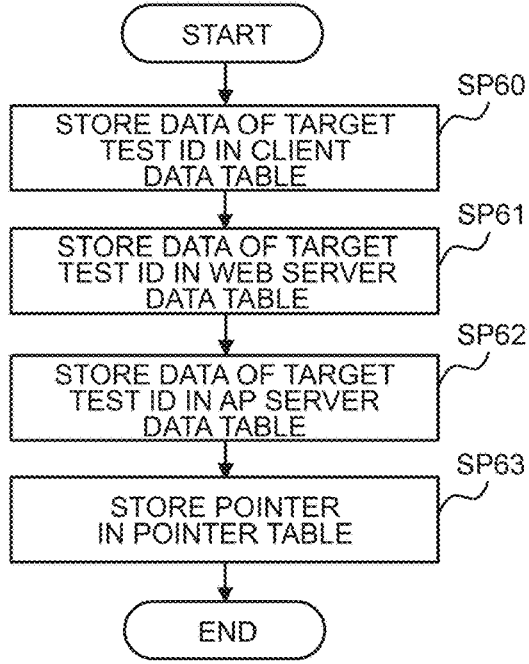
FIG. 17 is a flowchart showing the process steps of test result information integration processing.

Meanwhile, FIG. 17 is a flowchart showing the processing content of test result information integration processing that is executed by the test result information integration module 91 (FIG. 5) in the test result gathering integration program 54 which is installed on the test result integration apparatus 3. The test result information integration module 91 integrates evidence for the order placement test being conducted at the time and stores this evidence in the integrated test result information management table group 87, according to the process steps shown in FIG. 17.

In reality, when the test result gathering module 90 ends the test result gathering processing as described earlier with reference to FIG. 16, the test result information integration module 91 starts the test result information integration processing shown in FIG. 17, and foremost acquires the data of all the records associated with the test ID notified by the client layout agent 15 at the start of the order placement test, from the client screen data management table 80 and the HTTP telegram management table 81, and stores the acquired data in the client data table 100 (FIG. 10) (SP60).

Thereafter, the test result information integration module 91 acquires the data of all the records associated with the test ID from the AJP telegram management table 82 and web server log information management table 83 and stores the acquired data in the web server data table 101 (FIG. 10) (SP61).

Thereafter, the test result information integration module 91 acquires the data of all the records associated with the test ID from the SQL telegram management table 84, application server log information management table 85, and pre/post-update database table information management table 86 and stores the acquired data in the application server data table 102 (FIG. 10) (SP62).

Moreover, the test result information integration module 91 stores pointers, which are pointing at each of the data stored in the client data table 100, the web server data table 101, and the application server data table 102 respectively at this time, in the pointer table 103 (FIG. 10) (SP63), and then ends the test result information integration processing.

(1-4) Effect of this Embodiment

Thus, in the case of the information processing system 1 according to this embodiment, each time an order placement test is completed, the test result integration apparatus 3 gathers the test result evidence for the order placement test from each of the agents installed on the client 4, web server 5, and application server 6 (the client layout agent 15, web server layout agent 24, and application server layout agent 35 respectively) and integrates and manages this gathered evidence.

Thus, according to this information processing system 1, the operative is able to gather test result evidence for each order placement test from the client 4, web server 5 and application server 6 individually, which saves the operator the trouble of manually bringing together the gathered evidence for each order placement test, and to that extent the burden on the operative performing the system tests can be reduced.

Moreover, according to this information processing system 1, because the evidence is managed as data, paper is not required to create reports, and to that extent the space for storing reports can be reduced.

(2) Second Embodiment

In the information processing system 1 according to the first embodiment, when an order placement test fails, for example, the order placement test is performed again after repairing the problem with the program installed on the client 4 and the like, as necessary.

In this case, when the same order placement test is carried out, the database table 44 which is updated at the time of a failed order placement test among the database server tables 44 held by the database server 7 must be restored to a state prior to conducting the order placement test; however, when there are a lot of database tables 44 updated as a result of the order placement tests, corresponding labor and time are required to restore the database tables 44 to a state prior to the order placement test.

Therefore, one characteristic of this embodiment is that same was configured by installing, in the application server layout agent 35 (FIG. 1) according to the first embodiment, a database table restoration function which, according to a retest request sent from the test result integration apparatus 3, restores a database table 44, among the database tables 44 held by the database server 7, which has been updated due to an order placement test and designated in the retest request, to a state prior to the order placement test.

In reality, in the information processing system 120 (FIG. 1) according to this embodiment, when an order placement test fails, the operative operates the test result integration apparatus 3 after repairing a problem with the program installed on the client 4 and inputs an instruction to the effect that the order placement test is to be reperformed (hereinafter referred to as a retest instruction).

In addition, when such a retest instruction is input, the test result gathering integration program 54 installed on the test result integration apparatus 3 sends the retest request including the test ID of the order placement test to be reperformed to the application server layout agent 35.

Figure 18:
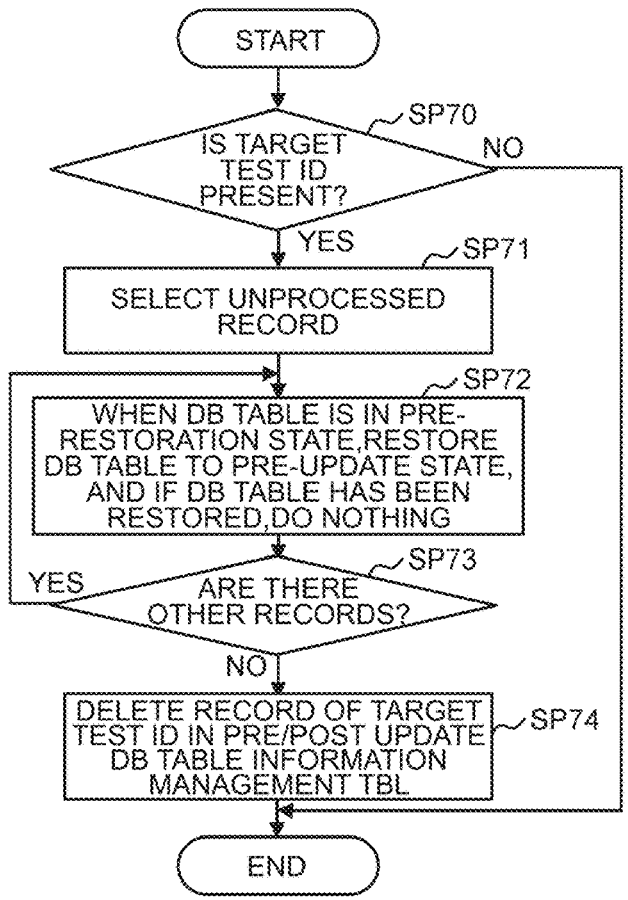
FIG. 18 is a flowchart showing the process steps of database table return processing.

When this retest request is supplied from the test result integration apparatus 3, the application server layout agent 35 restores the corresponding database table 44 which is held by the database server 7 to a state prior to the order placement test being conducted, according to the process steps shown in FIG. 18.

In reality, when the retest request is supplied from the test result integration apparatus 3, the application server layout agent 35 starts the database table restoration processing shown in FIG. 18, and foremost determines whether the test ID of the order placement test targeted for a retest contained in the retest request is present in the pre/post-update database table information management table 115 (FIG. 5) stored in the memory 31 (SP70).

Obtaining a negative result in this determination means that the pre/post-update data of the database table 44 when the order placement test, targeted for a retest, failed no longer remains in the pre/post-update database table information management table 115. The application server layout agent 35 thus ends the database restoration processing at this time.

On the other hand, obtaining an affirmative result in this determination of step SP70 means that the pre/post-update data of the database table 44 when the order placement test, targeted for a retest, failed remains in the pre/post-update database table information management table 115. Thus, the application server layout agent 35 selects the record for which the test ID of the order placement test targeted for a retest is stored in the test ID field (corresponds to the test ID field 86A in FIG. 9) and which was last registered in the pre/post-update database table information management table 115 (that is, the record relating to the update that was last performed in the order placement test) (SP71).

The application server layout agent 35 remains idle when the corresponding row of the database table 44 of the selected record has already been restored to a state prior to conducting the order placement test targeted for a retest, but when this database table 44 is in a state after the order placement test, targeted for a retest, has been conducted, the application server layout agent 35 restores the database table 44 to a state prior to performing the update corresponding to the record (SP72).

Thereafter, the application server layout agent 35 determines whether, among the records of the pre/post-update database table information management table 115, there exists a record for which the test ID of the order placement test targeted for a retest is stored in the test ID field and which corresponds to the update processing performed prior to the update processing corresponding to the record selected in step SP71 (SP73).

If an affirmative result is obtained in this determination, the application server layout agent 35 then returns to step SP72. The application server layout agent 35 then repeats the processing of steps SP72 to SP73 until an affirmative result is obtained in step SP73.

Furthermore, when a negative result is obtained in step SP73 by finishing before long to execute the processing of step SP72 for all those records for which the test ID of the order placement test targeted for a retest is stored in the test ID field, among the records of the pre/post-update database table information management table 115, the application server layout agent 35 deletes the record of the order placement test targeted for a retest in the pre/post-update database table information management table 115 (SP74) and then ends the database table restoration processing.

As explained in the foregoing, in the information processing system 120 according to this embodiment, the operative does not need to restore a database table that has been updated as a result of an order placement test to a state prior to the order placement test even if the order placement test has failed, thereby enabling a corresponding reduction in labor and time. Thus, when compared to the information processing system 1 of the first embodiment, the information processing system 120 according to this embodiment is able to further diminish the burden on the operative regarding order placement tests.

(3) Third Embodiment

In FIG. 1, 130 denotes the overall information processing system according to the third embodiment. When compared to the information processing system 120 according to the second embodiment, this information processing system is characterized in that built into the test result integration apparatus 131 (FIG. 1) is a test result compliance check function which checks the compliance of the test result of an order placement test that was conducted after a system configuration update such as an update to the application 34 installed on the application server 6 or to the database 45 managed by the database server 7.

Figure 19:
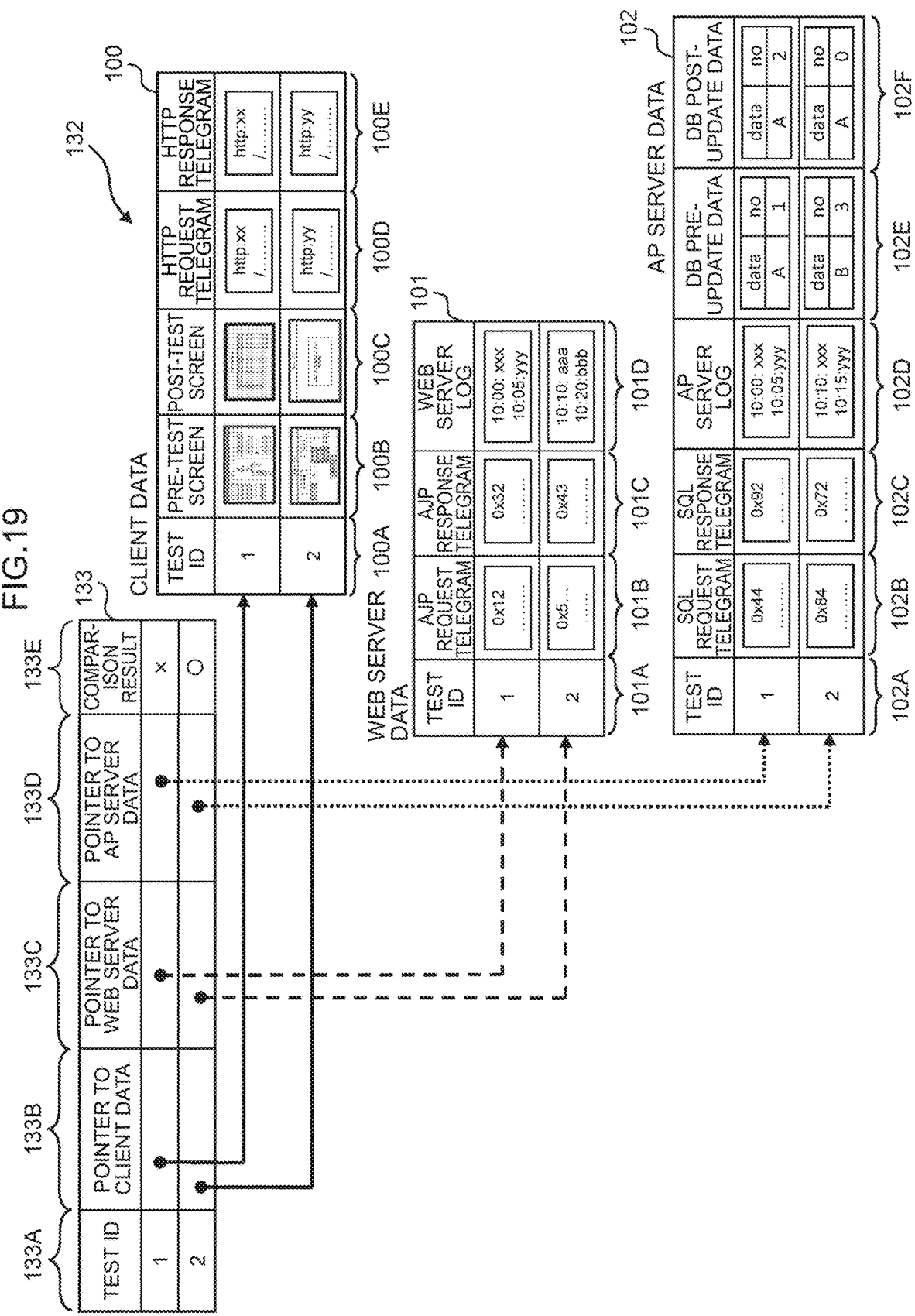
FIG. 19 is a conceptual drawing showing a configuration of an integrated test result information management table group according to the second embodiment.

In reality, according to this information processing system 130, as shown in FIG. 19, in which the same reference signs are assigned to corresponding parts in FIG. 10, the pointer table 133 of the integrated test result information management table group 132 held by the test result integration apparatus 131 comprises a comparison result field 133E in addition to the test ID field 133A, the first pointer field 133B, the second pointer field 133C, and the third pointer field 133D which are the same as the test ID field 103A, the first pointer field 103B, the second pointer field 103C, and the third pointer field 103D described earlier with reference to FIG. 10.

Moreover, if the system configuration is updated, and in response to a corresponding operation input by the operative, the test result information integration module 135 (FIG. 5) of the test result gathering integration program 134 (FIGS. 1 and 5) of this embodiment which is installed on the test result integration apparatus 131 saves the integrated test result information management table group 132 that has been used thus far and creates a new integrated test result information management table group 132, and subsequently uses this new integrated test result information management table group 132.

Furthermore, when the test result information integration processing described earlier with reference to FIG. 17 is complete, the test result information integration module 135 subsequently compares the test result of the current order placement test with the test result of the same order placement test gathered in the previous version, registers the comparison result in the comparison result field 133E in the pointer table 133 of the integrated test result information management table group 132 described earlier with reference to FIG. 19, and then displays the determination result on the display device 53 (FIG. 1) in response to a predetermined operation by the operative, according to the process steps shown in FIG. 20.

In reality, after an input to the effect that the system configuration has been updated is supplied by the operative, the test result information integration module 135 executes the test result information integration processing, and when the test result information integration processing is complete, starts the test result compliance check processing shown in FIG. 20, and foremost determines whether a test ID which is the same as the test ID of the current order placement test is present in the previous-version integrated test result information management table group 132 (SP80). Then, upon obtaining a negative result in this determination, the test result information integration module 135 ends the test compliance check processing.

On the other hand, upon obtaining an affirmative result in the determination of step SP80, the test result information integration module 135 compares the test result of the current order placement test stored in each of the client data table 100, web server data table 101, and application server data table 102, which the currently used integrated test result information management table group 132 comprises, with the test result of the order placement test conducted at the time of the previous-version system configuration and stored in each of the client data table 100, web server data table 101, and application server data table 102 which the integrated test result information management table group 132, used at the time of the previous-version system configuration, comprises (SP81).

The test result information integration module 135 then stores this comparison result in the comparison result field 133E in the pointer table 133 of the new integrated test result information management table group 132 (SP82). For example, if all the individual values of the test results of the current order placement test match all the individual values of the test results of the same order placement test in the previous system configuration version, the test result information integration module 135 stores a ○ [empty white circle] in the comparison result field 133E, and if the individual values of the test results of the current order placement test do not match all the individual values of the test results of the same order placement test in the previous system configuration version, the test result information integration module 135 stores an x [cross symbol] in the comparison result field 133E. The test result information integration module 135 then ends the test result compliance check processing.

Note that the above comparison result (○ [empty white circle] or x [cross symbol]), which is stored in the comparison result field 133E in the pointer table 133 of the integrated test result information management table group 132 as a result of the test result compliance check processing, can subsequently be displayed on the display device 53 (FIG. 1) of the test result integration apparatus 131 by means of a predetermined operation on the test result integration apparatus 131 (FIG. 1).

As described in the foregoing, in the information processing system 130 according to this embodiment, if the system configuration is updated, the test results of the order placement test in the previous system configuration are compared with the test results of the previous order placement test in the new system configuration, and the comparison result is displayed on the display device 53 in response to a request from the operative.

Therefore, the operative is thus able to determine whether there is a problem with the new system configuration based on the test results of the current order placement test and the test results of the same order placement test in the previous system configuration, which are displayed on the display device 53. Thus, according to this information processing system 130, if there is a system configuration update, it is possible to easily determine whether there is a problem with the new system configuration, and to that extent, the burden on the operative regarding order placement tests can be further reduced.

(4) Other Embodiments

Note that although the foregoing first to third embodiments were applied according to the present invention to the information processing system 1 configured as shown in FIG. 1, the present invention is not limited to the information processing system 1 and can be applied widely to a variety of other information processing systems.

Moreover, although the foregoing first to third embodiments were applied according to the present invention to a system for gathering evidence of test results of a system test accompanying a database update, the present invention is not limited to such a system, and can also be applied to a system which performs system tests accompanying an update to any information such as a file system, for instance, other than a database, or to simple files.

INDUSTRIAL APPLICABILITY

The present invention can be applied widely to various information processing systems which execute system tests requiring evidence to be gathered.

REFERENCE SIGNS LIST

1, 120, 130 . . . information processing system, 2 . . . order placement system, 3, 131 . . . test result integration apparatus, 4 . . . client, 5 . . . web server, 6 . . . application server, 7 . . . database server, 8 . . . head office system, 10, 20, 40, 40, 50 . . . CPU, 13, 53 . . . display device, 15 . . . client layout agent, 24 . . . web server layout agent, 35, 36 . . . log file, 35 . . . application server layout agent, 44 . . . database table, 45 . . . database, 54, 134 . . . test result gathering integration program, 60 . . . order placement screen, 66 . . . order placement completion screen, 90 . . . test result gathering module, 91, 135 . . . test result information integration module, 92 . . . integrated test result information display module, 110 . . . SQL control module, 111 . . . SQL analysis/SQL generation module, 112 . . . pre-update database table information acquisition module, 113 . . . post-update database table information acquisition module, 115 . . . pre/post-update database table information management table.

The invention claimed is:

1. An evidence gathering system which gathers evidence of one or more test results when one or more system tests accompanying one or more updates to a database in a system are executed, the system including a client, a first server apparatus which holds the database, and a second server apparatus which performs reading and writing of data to and from the database held by the first server apparatus, according to one or more requests from the client, the evidence gathering system comprising:

a first agent which is executed by a first processor in the client and configured to gather evidence of a respective test result in the client at the time of a respective system test;

a second agent which is executed by a second processor in the second server apparatus and configured to gather evidence, of the respective test result in the second server apparatus at the time of the respective system test, which includes at least pre-update and post-update data of the database which has been updated as a result of the respective system test; and a test result integration apparatus programmed to gather the evidence in the client of the respective system test from the first agent, gather the evidence in the second server apparatus of the respective system test from the second agent, and integrate the gathered evidence for each of the one or more system tests, wherein a command execution module is executed by the second processor in the second server apparatus and is configured to issue a respective command which updates the database held by the first server apparatus according to a respective request from the client, and wherein the second agent comprises:

a pre-update database information acquisition module which acquires the pre-update data of the database from the first server apparatus before the command execution module updates the database; and a post-update database information acquisition module which acquires the post-update data of the database from the first server apparatus after the command execution module has updated the database, wherein the first and second agents are each configured to associate the evidence with a corresponding test identifier which is specific to the respective system test and which is pre-notified before the respective system test is executed, and send the evidence associated with the corresponding test identifier to the test result integration apparatus, and wherein the test result integration apparatus is programmed to integrate, based on the corresponding test identifier associated with the evidence, the gathered evidence for each of the one or more system tests.

2. The evidence gathering system according to claim 1, wherein the test result integration apparatus is programmed to send a retest request which includes the corresponding test identifier of the respective system test to be retested to the second agent according to an external operation, wherein the second agent is configured to:

hold each of the acquired pre-update and post-update data for each of the system tests in association with each of the corresponding test identifiers, and restore when the retest request is supplied from the test result integration apparatus, the database to a pre-update state based on the data associated with the corresponding test identifier included in the retest request, from among the pre-update and post-update data for each of the held system tests.

3. The evidence gathering system according to claim 2, wherein the test result integration apparatus is programmed to:

hold the respective test result of the respective system test which is executed before a configuration change to the system according to a predetermined operation input which is externally supplied after the system configuration change, and compare the respective test result before the system configuration change with the respective test result of the respective system test executed after the system configuration change and displays a comparison result.

4. An evidence gathering method of gathering evidence of one or more test results when one or more system tests accompanying one or more updates to a database in a system which includes a client, a first server apparatus which holds the database, and a second server apparatus which performs reading and writing of data to and from the database held by the first server apparatus, according to one or more requests from the client, the evidence gathering method comprising:

gathering, by a first agent which is installed in the client, evidence of a respective test result in the client at the time of a respective system test;

gathering, by a second agent which is installed in the second server apparatus, evidence, of the respective test result in the second server apparatus at the time of the respective system test, which includes at least pre-update and post-update data of the database which has been updated as a result of the respective system test; and gathering, by a test result integration apparatus provided separately from the first and second server apparatuses, the evidence in the client of the respective system test from the first agent, and the evidence in the second server apparatus of the respective system test from the second agent; and integrating, by the test result integration apparatus, the gathered evidence for each of the one or more system tests, wherein the second server apparatus comprises a command execution module which issues a respective command for updating the database held by the first server apparatus according to a respective request from the client, the second agent acquires the pre-update data of the database from the first server apparatus before the command execution module updates the database, and acquires the post-update data of the database from the first server apparatus after the command execution module has updated the database, wherein the evidence is associated by the first and second agents with a corresponding test identifier which is specific to the respective system test and which is pre-notified before the respective system test is executed, and the evidence is associated with the corresponding test identifier is sent to the test result integration apparatus by the first and second agents.

5. The evidence gathering method according to claim 4, further comprising:

holding, by the second agent, each of the acquired pre-update and post-update database data for each of the system tests in association with each of the corresponding test identifiers, and the test result integration apparatus sends a retest request which includes the test identifier of the system test to be retested to the second agent, according to an external operation; and when the retest request is supplied from the test result integration apparatus, restoring, by the second agent, the database to a pre-update state based on the data associated with the corresponding test identifier included in the retest request, from among the pre-update and post-update data for each of the system tests.

6. The evidence gathering method according to claim 5, wherein the test result integration apparatus holds the respective test result of the respective system test which is executed before a configuration change to the system according to a predetermined operation input which is externally supplied after the system configuration change, and wherein the test result integration apparatus compares the respective test result before the system configuration change with the respective test result of the respective system test executed after the system configuration change and displays a comparison result.

\* \* \* \* \*